(12) United States Patent
Nakao et al.

(10) Patent No.: US 6,807,868 B1
(45) Date of Patent: Oct. 26, 2004

(54) CORIOLIS MASS FLOW METER

(75) Inventors: Yuichi Nakao, Tokyo (JP); Yasushi Ito, Tokyo (JP); Norio Sukemura, Tokyo (JP); Seiji Kobayashi, Tokyo (JP)

(73) Assignee: Oval Corporation, Tokyo (JP)

( * ) Notice: Subject to any disclaimer, the term of this patent is extended or adjusted under 35 U.S.C. 154(b) by 0 days.

(21) Appl. No.: 09/677,629

(22) Filed: Oct. 3, 2000

(30) Foreign Application Priority Data

Oct. 5, 1999 (JP) .......................................... 11-283924
May 9, 2000 (JP) ...................................... 2000-135335

(51) Int. Cl.[7] .............................................. G01F 1/84
(52) U.S. Cl. ............................. 73/861.355; 73/861.35
(58) Field of Search ...................... 73/861.354, 861.355, 73/861.356, 861.357

(56) References Cited

U.S. PATENT DOCUMENTS

| | | | | |
|---|---|---|---|---|
| 4,768,385 A | * | 9/1988 | Cage | 73/861.355 |
| 4,876,898 A | * | 10/1989 | Cage et al. | 73/861.355 |
| 4,895,031 A | * | 1/1990 | Cage | 73/861.38 |
| 5,549,009 A | * | 8/1996 | Zaschel | 73/861.355 |
| 5,663,509 A | * | 9/1997 | Lew et al. | 73/861.357 |
| 5,796,011 A | * | 8/1998 | Keita et al. | 73/861.357 |
| 5,850,039 A | * | 12/1998 | Van Cleve et al. | 73/861.357 |

FOREIGN PATENT DOCUMENTS

| | | |
|---|---|---|
| JP | 5-196488 | 8/1993 |
| JP | 10-48019 | 2/1998 |

* cited by examiner

*Primary Examiner*—Edward Lefkowitz
*Assistant Examiner*—Lilybett Martir
(74) *Attorney, Agent, or Firm*—McGlew and Tuttle, P.C.

(57) ABSTRACT

Two flow tubes 1 and 2 of a Coriolis mass flow meter are formed into an arch shape, with the tubes bent in only one direction. Entry-side and exit-side manifolds 25 are smoothly bent from the inlet of the entry-side manifold and the outlet of the exit-side manifold to joints connecting the two flow tubes to the manifolds, and connected to the flow tubes 1 and 2 at the joints at a predetermined angle in the same direction. By making the flow tubes into a parallel arched tube structure having good stress distribution and shock resistance, effects on the flow meter of external oscillations, installation conditions, piping stresses and thermal stresses can be reduced.

16 Claims, 4 Drawing Sheets

Fig. 1

Port connecting tube

Prior art

Fig. 6

Prior art

Fig. 7

CORIOLIS MASS FLOW METER

FIELD OF THE INVENTION

The present invention relates generally to a Coriolis flow meter, and more particularly to a Coriolis mass flow meter of a type using two parallel arched flow tubes.

BACKGROUND OF THE INVENTION

A mass flow meter (Coriolis mass flow meter) operating on the principle that when both ends of conduits carrying a flowing fluid being measured are supported and the conduits are caused to oscillate around the supporting fulcrums thereof in a direction perpendicular to the fluid's direction of flow, the Coriolis force exerted onto the conduits (the conduits to which oscillation is applied is hereinafter referred to as the flow tubes) is proportional to the mass flow rate of the fluid is well known. The flow tubes used in the Coriolis mass flow meter are divided into two types; the curved ones and the straight ones.

Figure 5:
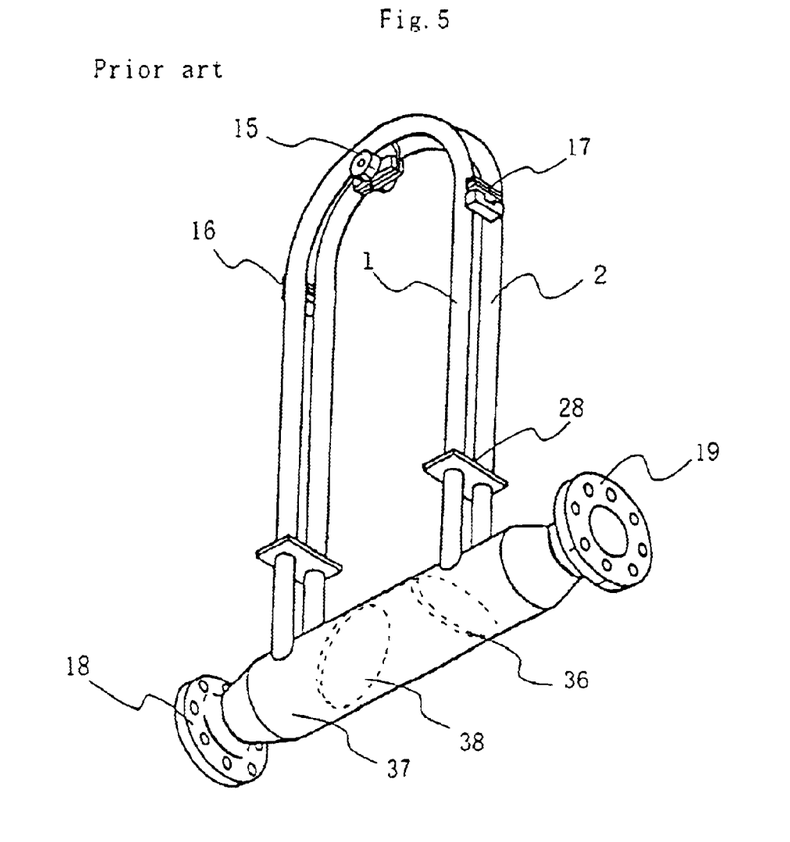
FIG. 5 is a schematic diagram of a Coriolis mass flow meter of a conventional dual parallel curved tube type.

FIG. 5 is a schematic diagram of a conventional Coriolis mass flow meter of a dual parallel curved tube type. As shown in the figure, flow tubes 1 and 2 comprise two parallel curved tubes (U-shaped tubes), and are driven at the middle part thereof by a drive unit 15 comprising a coil and a magnet so as to resonate with each other at mutually opposite phases. A pair of oscillation sensors 16 and 17 each comprising a coil and a magnet are disposed at locations symmetrical with respect to the mounting position of the drive unit 15 to sense a phase difference proportional to a Coriolis force.

A fluid being measured enters from an external conduit connected to the meter via an entry-side flange 18 into a tubular body 37 and is deflected 90 degrees by an end plate 38, branching equally into two flow tubes 1 and 2. The two fluid flows converge into one at the exit side of the flow tubes 1 and 2, and are deflected 90 degrees by an end plate 36 to be discharged into an external conduit connected to the meter via an exit-side flange 19. It is well known that the natural frequencies of the two flow tubes 1 and 2 can be made always substantially equal even for different types of fluids or for fluids at different temperatures by causing the fluid being measured to flow equally in the two flow tubes 1 and 2. It is also well known that a Coriolis flow meter capable of being driven efficiently and stably and being free from the effects of external oscillations and temperature changes can be provided based on the above construction.

The Coriolis mass flow meter of a curved tube type, which uses and measures the oscillation of the proximal parts of the flow tubes extending in the lateral direction from the tubular body 37, has to secure a length necessary for the proximal parts of the flow tubes extending in the lateral direction. This could inevitably lead to an increase in the size of the meter.

The Coriolis mass flow meter of a straight tube type, on the other hand, has straight flow tubes disposed in the direction of the external conduit, and the straight tubes supported at both ends thereof are oscillated at the middle part thereof in a direction perpendicular to the axis of the straight tubes to detect mass flow rate as a signal of the displacement difference, or phase difference caused by a Coriolis force between the supported parts and middle part of the straight tubes. The Coriolis mass flow meter of a straight tube type can be made into a simple, compact and sturdy construction.

The flow tubes of the straight tube type Coriolis mass flow meter, however, tend to be subjected to temperature fluctuations because the straight tubes must be fixedly supported at both ends thereof. That is, as the temperature of the fluid being measured changes, the flow tubes change its temperature by immediately responding to the change in fluid temperature, while there is a delay in the temperature change of a fixing structural member, such as a chassis to which the flow tubes are fitted. As a result, a difference in elongation is produced between the flow tubes and the fixing structural member, resulting in stresses in the longitudinal direction. This causes the natural frequency of the tube to change due to the changes in spring constant resulting from the stresses. To cope with this, the straight tube type Coriolis mass flow meter must have stress absorbing means, such-as a diaphragm, bellows, etc.

Figure 6:
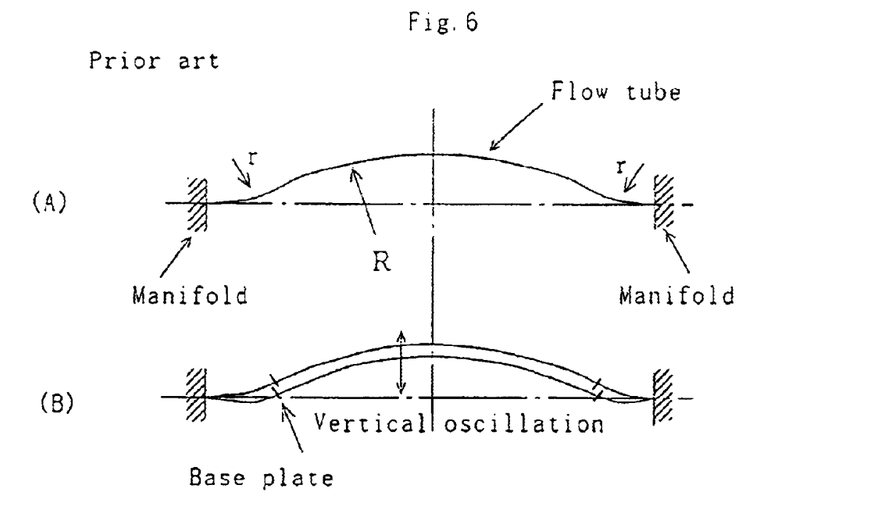
FIG. 6 is a conceptual diagram of assistance in explaining the operation of the conventional Coriolis mass flow meter having arched flow tubes.

The problem of the longitudinal elongation due to temperature changes can be solved by constructing the flow tube into an arch shape. FIG. 6 is a conceptual diagram of assistance in explaining the operation of the conventional Coriolis mass flow meter having arched flow tubes.

The flow tubes of an arch shape have excellent shock resistance since they can disperse stresses. In the conventional arched tube construction, however, the manifold and the flow tubes are connected in the axial direction of the tube. As illustrated by R in the middle, and two r's on both sides thereof in FIG. 6(A), the flow tube involves more than three bending steps, making this design unfavorable particularly for a dual-tube construction requiring symmetry. As shown in FIG. 6(B) illustrating the two states of the vertically oscillating flow tubes, the nodes of oscillation that would have been fixed by a base plate are also subjected to oscillation, making accurate measurement difficult.

SUMMARY OF THE INVENTION

The present invention is intended to overcome these problems, and it is an object of the invention to provide a Coriolis mass flow meter of a dual arched tube type that are immune to external oscillations, installation conditions, stresses in piping, and thermal stresses by forming the flow tubes into an arched parallel tube type that is favorable in stress dispersion and shock resistance.

It is another object of the present invention to increase rigidity in the direction of leaking oscillation, thereby reducing oscillation leaks without increasing the mass of the proximal parts of oscillation.

The Coriolis mass flow meter according to the present invention comprises two parallel flow tubes 1 and 2, an entry-side manifold 25 for branching the fluid being measured into the two flow tubes 1 and 2 from the fluid inlet, an exit-side manifold 25 for converging the fluid being measured flowing in the two flow tubes 1 and 2 to discharge through the fluid outlet, a drive unit 15 for driving the two flow tubes to cause them to resonate with each other in mutually opposite phases, and a pair of oscillation sensors 16 and 17 installed at symmetrical locations with respect to the mounting position of the drive unit 15 for sensing a phase difference proportional to a Coriolis force. The two flow tubes 1 and 2 are formed into an arch shape, or an arc shape curving in only one direction. The entry- and exit-side manifolds 25 are smoothly bent from the inflow direction of the entry-side manifold and the outflow direction of the exit-side manifold to the joints with the two flow tubes, at which the manifolds rise at a predetermined angle so as to be connected to the flow tubes 1 and 2 in alignment with them. This construction enables the flow tubes of an arched parallel tube type having excellent stress dispersion and shock resistance, resulting in a mass flow meter that is less affected by external oscillations, installation conditions, stresses in piping, and thermal effects.

The Coriolis mass flow meter according to the present invention comprises a sealed pressure-resistant case 31 of a substantially cylindrical shape in the axial direction, with the openings of the cylindrical part thereof at both ends closed by end plates connected with a smooth contour, and entry-side and exit-side manifolds 25 connected at the corners of the cylindrical part thereof in such a manner that the manifolds 25 pass through the corners. This construction increases rigidity in the direction of leaking oscillation, thereby reducing oscillation leaks without increasing the mass of the proximal parts of oscillation.

The Coriolis mass flow meter according to the present invention has a pair of integrally formed disc-shaped flanges at the entry-side and exit-side manifolds, to which both ends of the pressure-resistant case are fixedly fitted, with the cross-sectional shape of the pressure-resistant case made into an oval shape having a major axis oriented in the curved direction of the flow tubes, the length of the major axis smoothly reduced from the axial center toward both ends thereof into a substantially circular shape near both ends over a predetermined length.

The Coriolis masse flow meter according to the present invention has temperature sensors on the pressure-resistant case and near the joints connecting the flow tubes and the manifolds to compensate for the thermal effects of the distance between the fixed ends on both sides of the flow tubes and the thermal effects of the rigidity of the flow tubes.

DESCRIPTION OF THE PREFERRED EMBODIMENTS

A Coriolis mass flow meter of an arched tube type using dual parallel arched flow tubes as a first embodiment of the present invention will be described, referring to FIGS. 1 to 4. The Coriolis mass flow meter shown can be used either in the vertical or horizontal position, and when used in the horizontal position, the convex part at the center of the flow tubes can be oriented either upward or downward. It should be noted, however, that when used to measure gases, the convex part of the flow tubes should preferably be oriented upward, as shown in the figure, to prevent the liquid from staying at the convex part, and when measuring liquids, the convex part be directed downward to prevent gas bubbles from staying there.

Figure 1:
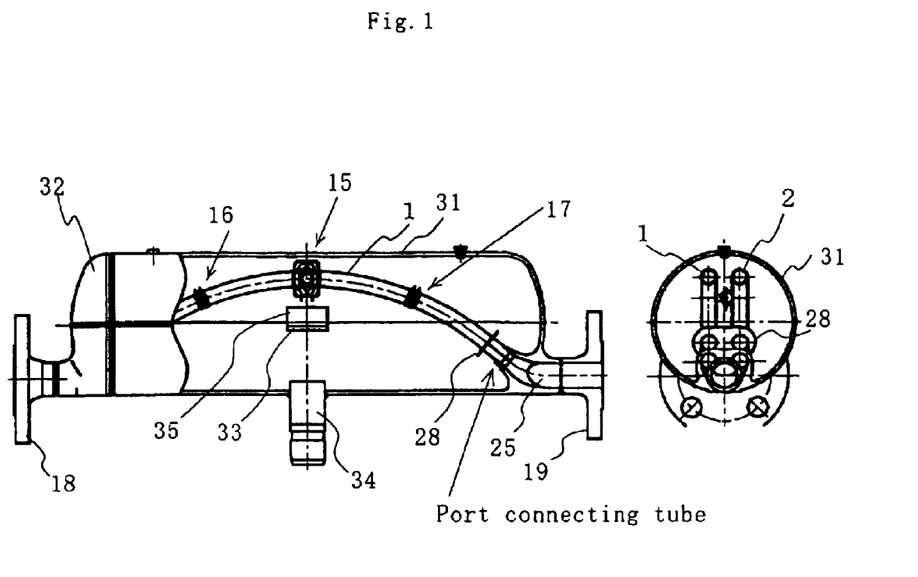
FIG. 1 is a partially cross-sectional view, seen from the front; and a side view, cut away at the manifold, of a first embodiment of a Coriolis mass flow meter using two parallel arched flow tubes according to the present invention.

FIGS. 1 to 4 are diagrams showing the Coriolis mass flow meter according to the present invention; FIG. 1 being a partially cross-sectional view (shown on the left) seen from the front on the assumption that the inlet and outlet pipes are installed horizontally and a side view (shown on the right) cut away at the manifold, FIG. 2 being a bottom view (shown on the left) seen from below in FIG. 1 and a side view (shown on the right) cut away at the center, FIG. 3 being a partially cross-sectional top view, and FIG. 4 being an enlarged view of the manifold.

The flow tubes 1 and 2 of the Coriolis flow meter shown are arched conduits having the same shape, both ends of each tube being connected to the entry-side and exit-side manifolds 25 by welding or other means. The fluid being measured is assumed to enter from the left side and flow out to the right side of FIG. 1. The fluid being measured enters from the external conduit connected via the flange 18 and is branched equally into the two flow tubes 1 and 2 at the entry-side manifold. At the exit side of the flow tubes 1 and 2, flows of the fluid being measured converge into one at the exit-side manifold 25 and flows out to the external conduit connected via the flange 19.

Since the inlet and outlet sides are arranged symmetrically, the following description will be made only about the outlet side shown in the figure. The manifold 25 rises from the outlet (the part connected to the flange 19) and turns upward at a predetermined angle, smoothly describing an arc (refer to FIG. 1 or 4), to the port connected to the flow tubes 1 and 2. By tilting the manifold port connected to the flow tubes at the angle at which the flow tubes rise, the entire manifold-flow tube assembly can be formed into a smooth arched shape, with the flow tubes themselves describing a simple one-way curve. Although the manifold forms two flow paths by branching the flow from one outlet into the two flow tubes 1 and 2 (refer to FIG. 3), the total cross-sectional area of flow paths can be gradually reduced to the cross-sectional area of the tubes. This leads to a substantial reduction in pressure loss.

In this way, the flow tubes 1 and 2, which are critical for oscillation measurement, is made into a simple one-way curved construction, while the complex structure involving the change of flow paths from the two flow tubes to the external piping is addressed by the manifolds. Thus, the flow tubes 1 and 2 can be fixedly fitted to the manifold by welding or other means, without providing flexible parts (stress absorbing means). The flow tubes of the arched tube shape can not only absorb thermal stresses but withstand stresses in the piping.

Base plates 28 for forming oscillation nodes when the flow tubes are driven are provided near both ends of the flow tubes 1 and 2. The base plates 28 are fixedly fitted to each other to maintain the flow tubes 1 and 2 in parallel position. The base plates 28, when provided, contribute to oscillation in such a manner that the point at which the base plate is fixed serves as a first fulcrum of oscillation while the joints at which the flow tubes 1 and 2 are connected to the upper ends of the entry-side and exit-side manifolds 25 serve as a second fulcrum.

The drive unit 15 is such that a drive unit coil is fitted to one flow tube 1 and a drive unit magnet to the other flow tube 2, respectively, via fixtures. The wiring to the drive unit coil is connected to the outside of the Coriolis mass flow meter via a flexible printed wiring board 12, a pedestal 35 mounted on a horizontal plate 33, and a wiring outlet 34. The wiring outlet 34 is supported by the pressure-resistant case 31 and passed through the case 31. A pair of oscillation sensors 16 and 17 are such that a oscillation sensor magnet is fitted to one flow tube 1, and a oscillation sensor coil fitted to the other flow tube 2, respectively, via fixtures on both sides of the drive unit 15.

Figure 2:
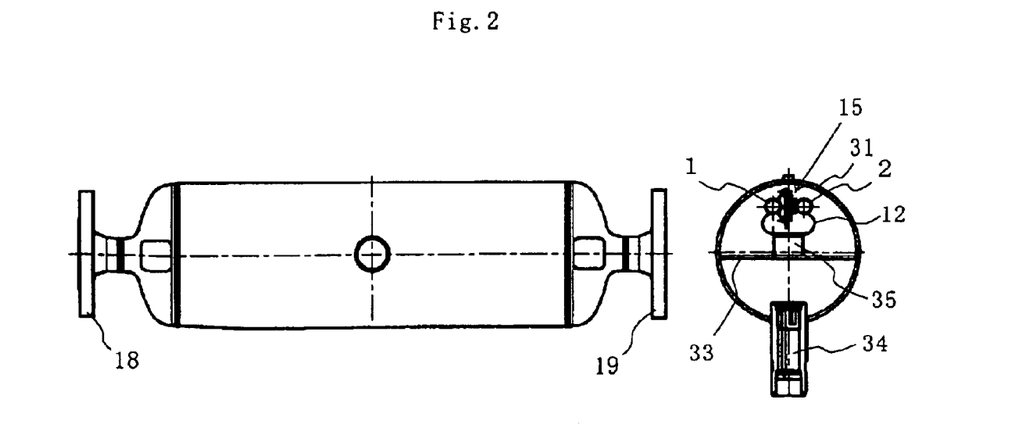
FIG. 2 is a bottom view, seen from below and a side view and cut away at the center, of the Coriolis mass flow meter shown in FIG. 1.
Figure 3:
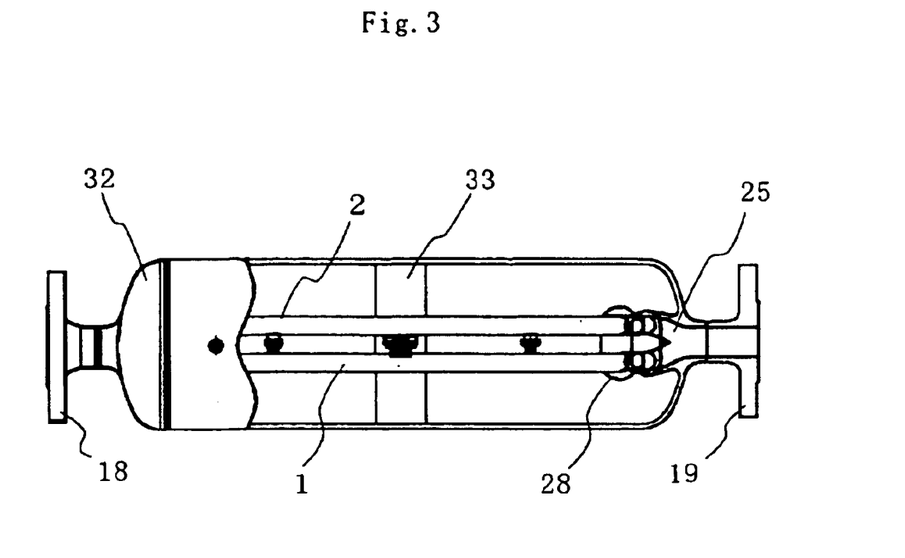
FIG. 3 is a partially cross-sectional top view of the Coriolis mass flow meter shown in FIG. 1.

The pressure-resistant case 31 holding the entire flow meter at the manifolds on both sides is formed into a sealed state by a cylinder of a substantially cylindrical shape in the axial direction and end plates 32 that close the openings of the cylinder with a smooth arc contour, as shown in FIG. 1, or in FIG. 2 or 3 seen in the direction vertical to FIG. 1. Entry-side and exit-side manifolds 25 are fitted to the corners of the cylindrical part of the pressure-resistant case 31, that is, to the surrounding parts of the end plates 32. By forming the pressure-resistant case 31 into a cylindrical shape in the axial direction in this way, the pressure resistance of the case 31 is greatly improved. As described earlier, the provision of the horizontal plate 33 at the center of the pressure-resistant case 31 helps reduce oscillation in the hoop mode where the case expands in the height direction and compresses in the width direction, or conversely compresses in the height direction and expands in the width direction.

Figure 4:
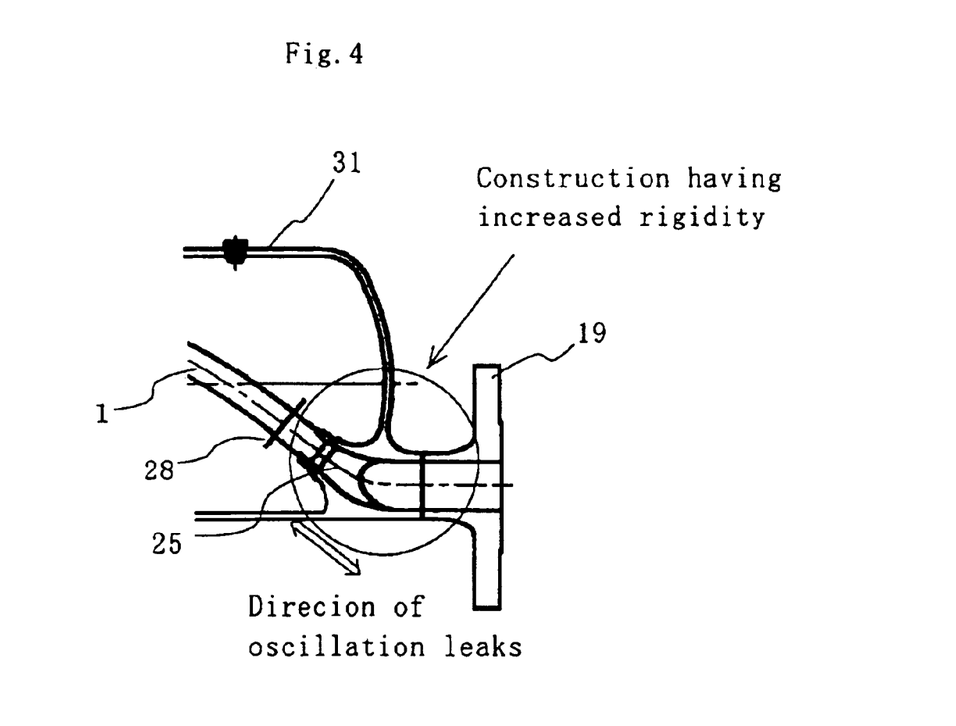
FIG. 4 is an enlarged view of the manifold shown in FIG. 1 to explain the function of the pressure-resistant case.

FIG. 4 is an enlarged view of the manifold portion to explain the function of the pressure-resistant case 31 having the aforementioned construction. When the arched flow tubes are driven, oscillation leaks in the axial direction of the tubes, as shown by an arrow in the figure. It is necessary therefore to increase rigidity in the direction of oscillation leaks. It is for this reason that proximal parts to which the oscillating flow tubes are fitted are provided at the corner parts that have the highest rigidity among other parts of the cylindrical pressure-resistant case. This enables the so-called monocoque structure by using the case itself as a frame connecting the proximal parts at the inlet and outlet sides without increasing the thickness of the pressure-resistant case. The monocoque structure where the case serves as a frame involves less oscillating elements, making the structure less susceptible to resonance.

The drive unit 15 drives the two flow tubes 1 and 2 to resonate with each other at mutually opposite phases at the central part thereof. A pair of oscillation sensors 16 and 17 are disposed at locations horizontally symmetrical with respect to the mounting location of the drive unit 15 to detect the phase difference proportional to a Coriolis force. The drive unit 15 and the oscillation sensors 16 and 17 shown in the figure are disposed between the axes of the flow tubes 1 and 2. In other words, when the two flow tubes are seen in the mutually overlapped direction, as shown in FIG. 1, the drive unit 15 and the oscillation sensors 16 and 17 are disposed between the flow tubes 1 and 2, with the centers located on a line connecting the central axes of the two flow tubes. Since this permits driving force to act and the Coriolis force resulting from the driving force to be detected on the line connecting the central axes of the flow tubes, no moment of inertia is generated due to the inertial force of oscillation.

Figure 7:
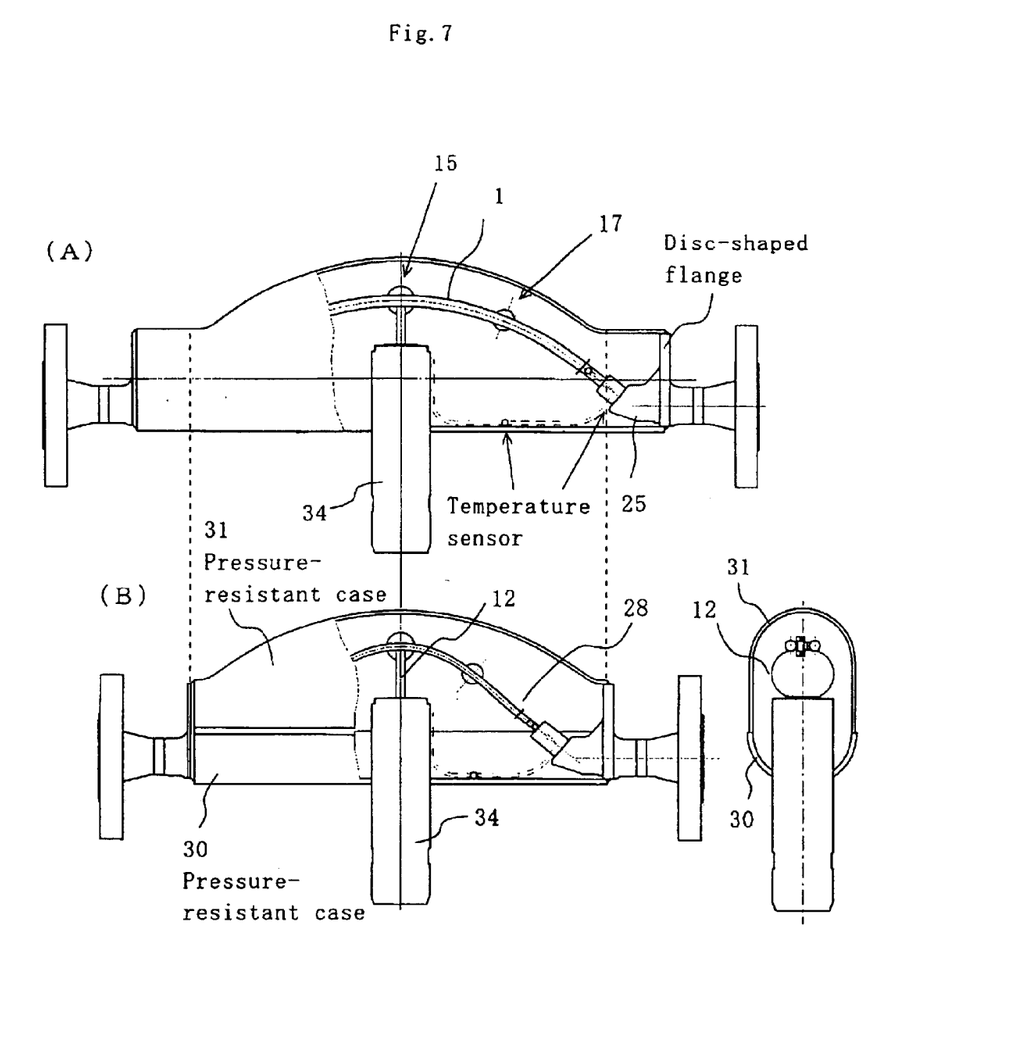
FIG. 7 is a diagram illustrating a second embodiment of a Coriolis mass flow meter using two parallel arched flow tubes according to the present invention.

FIG. 7 shows a second embodiment of the Coriolis mass flow meter of the arched tube type using dual parallel arched flow tubes according to the present invention. FIG. 7 shows, in partial cross section, two types of Coriolis mass flow meters (A) and (B) having connecting pipes and flow tubes of different sizes to measure different flow ranges. The Coriolis mass flow meter (A) shown in the upper part of FIG. 7 is designed to have a larger flow measurement range than the Coriolis mass flow meter (B) shown in the lower part. As for the flow meter (B) shown in the lower part of the figure, a cross-sectional view taken near the axial center is also shown on the right side of the flow meter (B). The cross-sectional view of the flow meter (A) in the upper part of the figure is not shown because it has substantially the same cross section shape, though its size is slightly larger.

The shapes of the flow tubes of the Coriolis mass flow meter shown and the entry-side and exit-side manifolds to which the flow tubes are connected are essentially the same as those in the first embodiment described with reference to FIGS. 1 to 4. That is, the flow tubes 1 and 2 themselves, which are critical for oscillation measurement, have a construction where the tubes are bent simply in one direction, while complex flow path changes are dealt with by the manifolds. The flow tubes 1 and 2 can be fixedly fitted to the manifolds by welding or other means. This results in a structure that can eliminate the need for flexible parts (stress absorbing means), absorb thermal stresses by the arched tube design of the flow tubes, and withstand stresses in the piping. The second embodiment is the same as the first embodiment in that base plates 28 are provided near both ends of the flow tubes 1 and 2 to form nodes of oscillation when the flow tubes are driven.

The installation and arrangement of the drive unit 15 and a pair of oscillation sensors 16 and 17 are essentially the same as those in the first embodiment. The wiring to the drive unit and the oscillation sensors 16 and 17 is connected to the outside of the Coriolis mass flow meter via the flexible printed wiring board 12 and the wiring outlet 34.

As shown in the figure, temperature sensors are provided at two locations. Changes in the distance between the fixed ends of the flow tubes on both ends thereof must be compensated because they may adversely affect the oscillation frequency. An apparatus shown in the figure is designed to make compensation based on an estimated elongation of the pressure-resistant case by measuring typical temperatures of the pressure-resistant case. Another sensor is provided to measure temperatures in the vicinity of the joints at which the flow tubes are connected to the manifolds. This sensor is used for compensating the changes in rigidity resulting from changes in the temperature of the flow tubes.

The flow meter shown in FIG. 7 has a construction in which the ease of manufacture has been taken into account. Although the flow tubes used in the two flow meters (A) and (B) shown in the figure are supposed to have different diameters, the constructions of these flow meters are such that manifolds of the same size can be used even with the flow tubes of different diameters.

Disc-shaped flanges are integrally formed together with the manifolds on both sides so that the inside of the flow meter is sealed from the outside by connecting the pressure-resistant case to the disc-shaped flanges by welding or other means. This pressure-resistant case is divided into pressure-resistant cases 30 and 31 for the ease of manufacture. The pressure-resistant cases 30 and 31 are joined together by welding or other means to form a pressure-resistant case. When joined together, the pressure-resistant case has an oval cross-sectional shape, with the major axis thereof oriented in the curved direction of the flow tubes, as shown in FIG. 7. The oval cross-sectional shape of the pressure-resistant case is such that the oval cross-sectional shape has the largest vertical length at the central part in the axial direction, from which the vertical length is gradually and smoothly reduced symmetrically toward both ends. At both ends where the pressure-resistant case is connected to the flanges, the cross section of the case assumes a substantially circular shape over a predetermined length in the axial direction.

By forming the cross section into an oval or substantially circular shape in the axial direction in this way, not only the case has improved pressure resistance, but also the manufacture of the pressure-resistant case itself and the assembly of the case into the Coriolis mass flow meter become easy. Now, this will be described in the following.

As the size of the flow meter increases, the axial length also increases. This is shown by two dotted lines connecting the two flow meters (A) and (B) shown in the upper and lower parts of FIG. 7. Even with the two flow meters of different sizes, the shape of the pressure-resistant cases 30 and 31 can be made the same within the range shown by the two dotted lines. In other words, flow meters of various sizes can be manufactured by stamping out pressure-resistant cases of the same size using the same press die, and changing the cropping length of both ends. Furthermore, since the pressure-resistant case at both ends has a circular cross-sectional shape having an almost constant diameter, the flanges can be welded to the pressure-resistant case easily without being obstructed by the flanges themselves.

The Coriolis mass flow meter according to the present invention of the arched tube type formed by bending flow tubes in only one direction can satisfactorily distribute stresses in piping, thermal stresses, etc. Even when the flow tubes have been deformed, little adverse effects of the deformed flow tubes could be caused because the arched flow tubes have a continuous bend without singular points. Moreover, the arched flow tubes are less subject to the adverse effects of pressure because the arched flow tubes have a large curvature radius, and as a result the cross section of the pipes has a low oblateness. In addition, the arched flow tubes are less subject to degradation of tube material and reduction of wall thickness.

The Coriolis mass flow meter according to the present invention is hard to clog, easy to clean, and less subject to pressure loss because it has no sharp bends in the tubes and manifolds. As the fluid flow branches and rises to the arched flow tubes within the manifold portion, the flow path can be reduced, and the centrifugal force caused by the whirling flow can prevent the fluid flow from separating at bends.

Furthermore, the present invention has a beneficial effect of having less adverse effects on the piping of oscillation leaks to the outside of the flow meter because oscillation leaks disperse in the axial direction of the tubes and the direction vertical to the tube axial direction.

Further, the present invention, in which the pressure-resistant case is formed into a simple cylindrical shape in the axial direction, can have a required minimum uniform wall thickness. This leads to less thermal capacity and improved thermal response.

Furthermore, the present invention has a construction easy to manufacture because both ends of the pressure-resistant case are fixedly fitted to disc-shaped flanges integrally formed with the manifolds, and the cross-sectional shape of the pressure-resistant case is made into an oval shape, with the length of the major axis thereof changing smoothly.

What is claimed is:

1. A Coriolis mass flow meter, comprising:
   two parallel flow tubes curved into an arch shape having joint ends, each of the joint ends having an end direction;
   an entry-side manifold with curved branches connected to one set of said joint ends of said two flow tubes, said branches each carrying a portion of a fluid being measured from an inlet port into said two flow tubes, said entry-side manifold being a separate structure than said two parallel flow tubes;
   an exit-side manifold with curved branches connected to another set of said joint ends of said two flow tubes, said exit-side manifold with curved branches converging flows of said fluid being measured flowing in said two flow tubes into an outlet port to discharge said fluid being measured, said exit-side manifold being a separate structure than said two parallel flow tubes;
   a drive unit for driving and resonating one of said flow tubes with another of said flow tubes at mutually opposite phases; and
   a pair of oscillation sensors installed along said two parallel flow tubes curved into an arch shape at locations horizontally symmetrical with respect to an installation location of said drive unit for sensing a phase difference proportional to a Coriolis force, said two flow tubes being connected to said entry-side manifold and to said exit-side manifold at respective said joint ends and said two flow tubes being formed into the arch shape that is bent in only one direction, said entry-side manifold curved branches being smoothly bent from an inlet direction of said entry-side manifold to a connection direction at an end of said two manifold outlets that is the same as the end direction of said joint ends, said exit-side manifold curved branches being smoothly bent from an outlet direction of said exit-side manifold to a connection direction at an end of said two manifold inlets that is the same as the end direction of said joint ends.

2. A Coriolis mass flow meter as set forth in claim 1 further comprising a sealed pressure-resistant case of a cylindrical shape in axis direction, with openings of the cylindrical portion thereof closed by end plates, wherein said entry-side and exit-side manifolds are installed at corners of said cylindrical portion and passed through said corners.

3. A Coriolis mass flow meter as set forth in claim 1 wherein:
   a pressure-resistant case is arranged around said two flow tubes;
   said entry-side and exit-side manifolds have a pair of integrally formed disc-shaped flanges, to which both ends of said pressure-resistant case are fixedly fitted;
   the cross-sectional shape of said pressure-resistant case being an oval shape with the major axis oriented in the curved direction of said flow tubes, with the length of said major axis smoothly and gradually reduced from the axial central part thereof to both ends thereof into a substantially circular shape over a predetermined length near both ends.

4. A Coriolis mass flow meter as act forth in claim 3 further comprising a temperature sensor provided on said pressure-resistant case for compensating the thermal effects of a distance between fixed ends on both sides of said flow tubes, said a temperature sensor provided near said joints connecting said flow tubes to said manifolds for compensating the thermal effects of the rigidity of said flow tubes.

5. A Coriolis mass flow meter comprising:
   two flow tubes each having only one a curve and each flow tube having first and second joint end, each curve of said flow tubes lying in a respective plane, said planes of said curves of said flow tubes being arranged substantially parallel, said each curve being in only one direction and forming an arch extending fully from a respective said first joint end to a respective second joint end;

an entry-side manifold with an inlet port portion and two outlet ports forming branches curved with respect to the inlet port portion, said two outlet pert branches being connected to said first joint ends of said two flow tubes and dividing an entry passage from said inlet port into said branches joined to said two flow tubes, said entry passages having a smooth curve from said inlet port to said outlet ports with an axial direction of each of said outlet ports at an acute angle relative to said an axial direction of said inlet port, an axial direction of said entry passage at said outlet ports being in a substantially same direction as an axial direction of a respective said flow tube at said respective first joint end of said respective flow, said entry-side manifold being a separate structure than said two flow tubes;

an exit-side manifold with an outlet port portion and two inlet post branches, said inlet port branches being connected to said second joint ends of said two flow tubes and joining exit passages from said inlet ports to said outlet port portion, each of said exit passages having a smooth curve from respective said inlet ports to said outlet port with an axial direction of each of said inlet ports at an acute angle relative to an axial direction of said outlet port portion, an axial direction of said exit passages at said inlet ports being in a substantially same direction as an axial direction of a respective said flow tube at said respective second joint end of said respective flow tube, said exit-side manifold being a separate structure than said two parallel flow tubes;

a drive unit for driving and resonating one of said flow tubes with respect to another of said flow tubes at mutually opposite phases;

a pair of oscillation sensors installed at locations symmetrical with respect to said drive unit for sensing a phase difference proportional to a Coriolis force of fluid in said two flow tubes.

6. A meter in accordance with claim 5, wherein:
said axial directions of said first joint ends is non-parallel with said axial directions of said second joint ends.

7. A meter in accordance with claim 5, wherein:
said axial directions of said first joint ends is angularly spaced from said axial directions of said second joint ends.

8. A meter in accordance with claim 5, further comprising:
a sealed pressure case surrounding said two flow tubes, said pressure case having a cylindrical shape with ends of said cylindrical shape closed by end plates and forming corners with said cylindrical shape, said entry and exit manifolds being arranged in said corners of said case.

9. A meter in accordance with claim 8, wherein:
said end plates are flanges of said entry and exit manifolds;
a radial cross section of said pressure case has an oval shape with a major axis of said oval shape being oriented in a curved direction of said flow tubes, a length of said major axis being a maximum at a central portion of said pressure case and diminishing toward said ends of said cylindrical shape to have said cross section of said pressure case change to a substantially circular shape at said ends of said cylindrical shape.

10. A meter in accordance with claim 8, further comprising:

a first temperature senior arranged on said pressure case and measurable of temperatures effecting a distance between said joint ends of said flow tubes;

a second temperature sensor arranged on one of said flow tubes and said manifolds, said second temperature sensor being measurable of temperatures effecting rigidity of said flow tubes.

11. A meter in accordance with claim 5, wherein:
said each curve is continuous from said first joint end to said second joint end.

12. A Coriolis mass flow meter comprising:
an entry-side manifold with an inlet portion and integral first inlet branch and integral second inlet branch, said inlet portion extending in an axial direction, said first inlet branch bending to terminate at a first inlet branch end with a first inlet connection direction at an acute angle to said axial direction, said second inlet branch bending to terminate at an second inlet branch end with a second inlet connection direction at an acute angle to said axial direction;

an exit-side manifold with an outlet portion and integral first outlet branch and integral second outlet branch, said outlet portion extending substantially in said axial direction, said first inlet branch bending to terminate at a first inlet branch end with a first inlet connection direction at an acute angle to said axial direction, said second inlet branch bending to terminate at an second inlet branch end with second inlet connection direction at an acute angle to said axial direction;

a first arched flow tube having a curve in only one direction and lying in a first plane, said first arched flow tube extending from a first arched flow tube first joint end to a first arched flow tube second joint end, said first arched flow tube first joint end being along said first inlet connection direction and being connected to said first inlet branch end and said first arched flow tube second joint end being along said first outlet connection direction and being connected to said first outlet branch end, said first arched flow tube being a separate stricture than said entry-side and said exit-side manifolds;

a second arched flow tube having a curve in only one direction and lying in a second plane, said second arched flow tube extending from a second arched flow tube first joint end to a second arched flow tube second joint end, said second arched flow tube first joint end being along said second inlet connection direction and being connected to said second inlet branch end and said second arched flow tube second joint end being along said second outlet connection direction and being connected to said second outlet branch end, said first plane and said second plane being substantially parallel, said second arched flow tube being a separate structure than said entry-side and said exit-side manifolds;

a drive unit for driving and resonating said first arched flow tube with respect to said second arched flow tube at mutually opposite phases;

a pair of oscillation sensors installed at locations symmetrical with respect to said drive unit for sensing a phase difference proportional to a Coriolis force of fluid in said two flow tubes.

13. A Coriolis mass flow meter comprising:
a plurality of tubes with each tube having first and second joint ends, each of said plurality of tubes having only a single curve in one direction, said curve forming an arch extending fully from a respective said first joint end to a respective second joint end;

first and second manifolds formed separately from said plurality of tubes, each said manifold having a main branch and a plurality of divided branches, each of said divided branches having a curve in one direction with respect to said main branch, said divided brunches of said first manifold being connected to said first joint ends of said plurality of tubes with ends of said divided branches being in a same direction as said first joint ends of said plurality of tubes, said divided branches of said second manifold being connected to said second joint ends of said plurality of tubes with ends of respective said divided branches being in a same direction as said second joint ends of said plurality of tubes;

a drive unit connected to said tubes for driving and resonating one of said tubes with respect to another of said tubes at mutually opposite phases;

a pair of oscillation sensors connected to said tubes at locations symmetrical with respect to said drive unit for sensing a phase difference proportional to a Coriolis force of fluid in said two flow tubes.

14. A flow meter in accordance with claim 13, wherein:

said curve of said tubes and said divided branches are shaped to have said main branches of said manifolds be substantially aligned with each other when said divided branches are connected to said tubes.

15. A method in accordance with claim 14, wherein:

said curve of said tubes and said divided branches are shaped to have said curves of said divided brunches of said manifolds be substantially in the same plane as said curve of a respective said tube when said tubes are connected to said manifolds.

16. A method in accordance with claim 13, wherein:

said curve of said tubes and said divided branches are shaped to have said curves of said divided branches of said manifolds be substantially in the same plane as said curve of a respective said tube when said tubes are connected to said manifolds.

* * * * *